United States Patent

[11] 3,614,575

| [72] | Inventor | Hymie Cutler<br>Detroit, Mich. |
|---|---|---|
| [21] | Appl. No. | 62,229 |
| [22] | Filed | Aug. 5, 1970 |
| [45] | Patented | Oct. 19, 1971 |
| [73] | Assignee | The Bendix Corporation |

[54] NUMERICAL CONTROL SYSTEM WITH CONTROLLED DWELL
12 Claims, 5 Drawing Figs.

[52] U.S. Cl. .................................................. 318/569, 318/571
[51] Int. Cl. ............................................ G05b 19/18
[50] Field of Search.......................................... 318/603, 600, 567, 569, 571, 572, 601, 604, 605, 568

[56] References Cited
UNITED STATES PATENTS

| 2,996,348 | 8/1961 | Rosenberg................... | 318/568 X |
| 3,419,800 | 12/1968 | Levi et al..................... | 318/600 X |
| 3,475,997 | 11/1969 | Wohlfeil...................... | 318/603 X |
| 3,562,619 | 2/1971 | Hyoguchi et al............. | 318/603 |

Primary Examiner—Benjamin Dobeck
Attorneys—William F. Thornton, Barnard, McGlynn and Reising and Plante, Hartz, Smith and Thompson ABSTRACT: A numerical control system for a lathe includes means for inhibiting the execution of one of a series of commanded motions until the previous command has been acted on for a sufficient time to insure its execution. The system measures the error between the actual and commanded positions of the controlled part by comparing the phase displacement between the reference and command square waves in a phase analog servo. When the command-position error reaches a predetermined minimum value, indicating that the cutter is very close to its commanded position, pulses generated upon each incremental rotation movement of the spindle are counted until a number has been reached indicating one full spindle revolution. At that point the inhibition of the subsequent command is removed.

INVENTOR.
Hymie Cutler
BY
Bernard, McGlynn & Reising
ATTORNEYS

NUMERICAL CONTROL SYSTEM WITH CONTROLLED DWELL

BACKGROUND OF THE INVENTION

1. Field of the Invention

This invention relates to numerical control systems for machine tools, and in particular to a system for controlling the time of termination of one command in a control sequence, and the initiation of the next command, in terms of the motion of the machine components.

2. Prior Art

In numerical control systems of both the contouring and positioning varieties, control of machine motion is achieved in accordance with a program which contains a sequence of commands each of which involves a predetermined motion of the machine cutter with respect to a workpiece. Means are provided in such systems to determine when a command currently being executed by the machine has been completed, and to initiate execution of the subsequent command. In point-to-point numerical control systems employing closed loop servos, the completion of a command under execution is sensed by comparing the actual and the commanded positions. When they are equal, the command is assumed to have been completed and the next command in the sequence is initiated. In contouring systems of the type which generate command pulse trains, the completion of a command is assumed when a sufficient number of pulses have been generated to achieve the command.

When certain classes of cuts are being performed on workpieces, these methods of determining completion of a cut may not be sufficiently rigorous to assure the formation of the programmed cut. For example, when a cut is being made by a lathe tool to form a shoulder on a workpiece, if the tool is withdrawn as soon as a programmed axial tool position has been reached, a perfectly square shoulder will not be formed. Rather, it is necessary to maintain the tool in its commanded end position for at least one full rotation of the workpiece to insure the squareness of the shoulder. Similar situations are encountered in boring and drilling to a fixed dimension, milling to a land, etc.

In order to allow a sufficient tool dwell to achieve the desired part configuration when cuts of this nature are performed, previous numerical control systems have incorporated means for allowing the programmer to specify a dwell time during which a command is continued to be executed after its nominal completion, and during which the execution of the subsequent command is inhibited. In certain systems the period of this dwell is specified as part of the program and in other systems the program calls for a dwell which has been preset on the control panel by the operator. In either case, the machine interprets these dwell times in terms of the internal clock system of the machine and achieves the predetermined delay.

In such a system, it is necessary to specify a sufficiently long dwell to insure the full completion of the desired dimension under all conditions of machine operation. Under normal conditions of operation, this conservative dwell time will substantially exceed the time required for the cutter to fully form the workpiece in the desired manner and for the balance of the dwell time the cutter will merely scrape the workpiece surface. This scraping is very undesirable in that it causes unnecessary tool wear and tends to work-harden the contacted area of the part. The degree of this work-hardening is dependent upon the metallurgy of the part, and with certain metals such as work-hardening stainless steel the effects may be very severe. If the cut on which this excessive dwell occurs is a roughing cut, this work-hardened section may interfere with the proper operation of the system on subsequent finishing passes, and may even prevent the achievement of a desired finished dimension. Additionally, if a number of such dwells are programmed in the cutting of a part, the time they add to the completion of a program may be appreciable.

SUMMARY OF THE PRESENT INVENTION

The present invention is addressed to a subsystem, for use in a numerical control system, which will, under program control, provide a dwell which is optimum under the circumstances so as to allow finishing of the desired cut with no drag of the cutter over the workpiece. This is broadly achieved by defining the delay as a function of the relative movement between the cutter and the tool, rather than a predetermined time period as was done in the prior art. In a preferred embodiment of the invention which is subsequently described in detail, when a dwell is programmed, either as part of a command block or as a separate block subsequent to that command, the following error between the actual and commanded positions is monitored and when it reaches a predetermined minimum level indicating that the machine has just about achieved its commanded position a count is begun of the pulses produced by a transducer associated with the machine spindle which produces a pulse for each small incremental rotational movement of the spindle. When the count of pulses indicates that the spindle has made a full revolution since the count began the next command is initiated. This system insures that the spindle will make the desired single full revolution with the cutter in the commanded position so that the desired shoulder or land is precisely and accurately formed without causing any undesirable nonmetal removal contact between the tool and workpiece.

Other objects, advantages and applications of the present invention will be made apparent by the following detailed description of a preferred embodiment of the invention which is incorporated within a contouring numerical control system for a lathe. The description makes reference to the following drawings in which.

Figure 1:
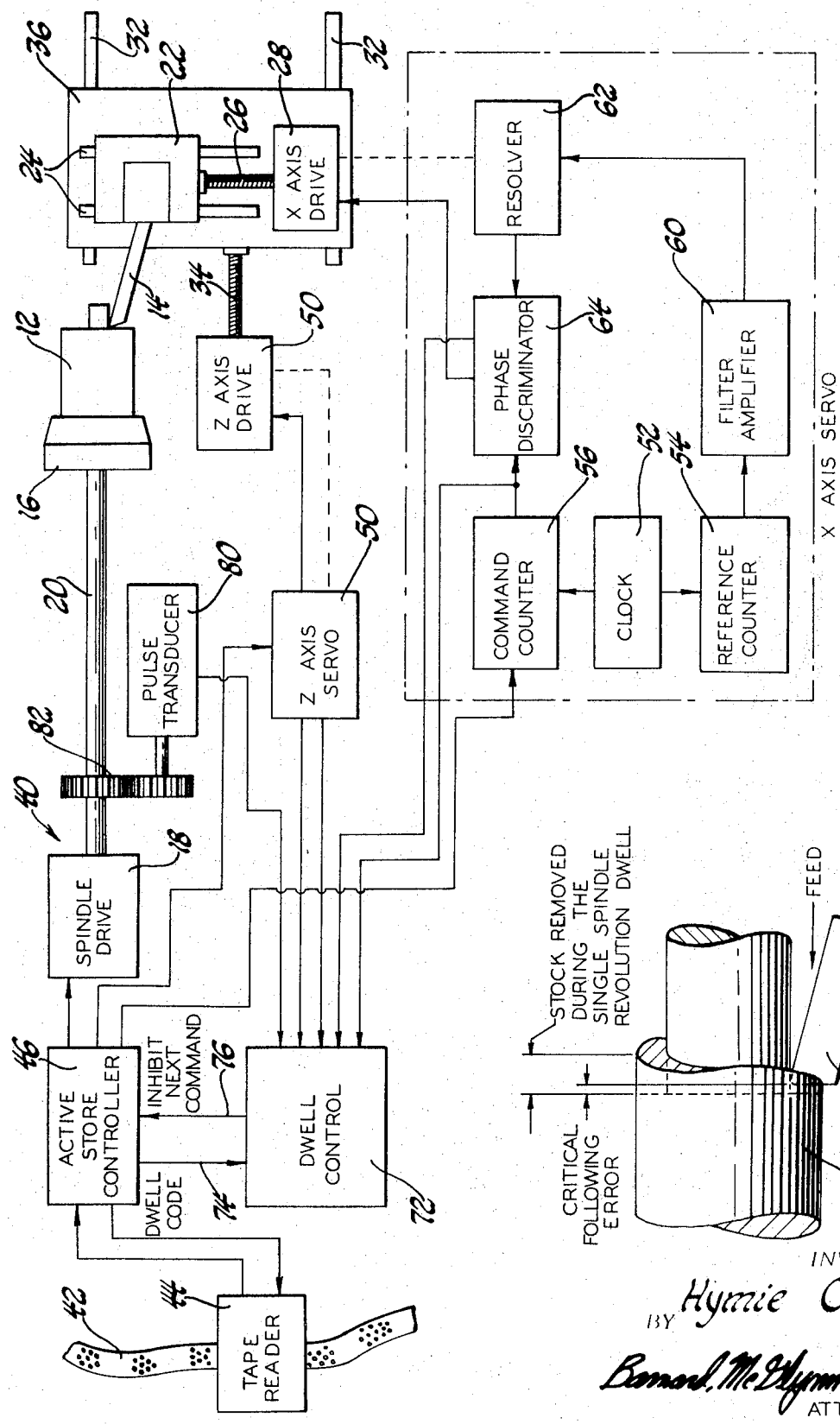
FIG. 1 is a partially block, partially schematic diagram of the lathe control system embodying the invention.
Figure 2:
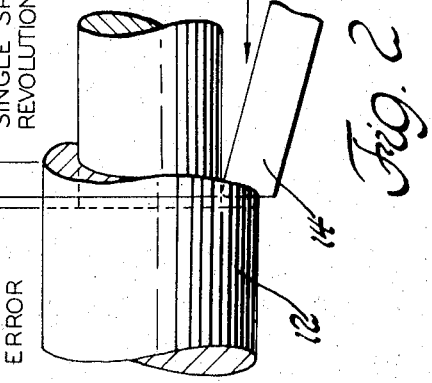
FIG. 2 is an illustration of the relationship between the lathe cutter and a workpiece while a shoulder is being formed under numerical control.

Referring to FIGS. 1 and 2, the preferred embodiment of the invention takes the form of a numerical control system for a lathe of the type generally indicated at 10. The lathe is illustrated as operating upon a cylindrical workpiece 12 by means of a cutter 14. The workpiece 12 is supported for rotation in a chuck 16 which is rotated by a suitable spindle drive 18 through a shaft 20.

The cutter 14 is supported in a holder 22 for a movement in a direction normal to the axis of rotation of the spindle along a pair of parallel X-ways 24. Rotation of a lead screw 26, powered by an X-axis drive 28, moves the holder 22 along the ways 24. The ways 24 and the drive 28 are affixed to a slide 20 which is in turn supported for motion in a direction parallel to the axis of rotation of the spindle 16, along a pair of Y-ways 32. The slide 20 is driven along the ways 32 by a lead screw 34, powered by a Z-axis drive 36.

The spindle drive 18, the X-axis drive 28, and the Z-axis drive 36 are powered by a numerical control system, generally indicated at 40, to form the workpiece 12 in accordance with a part program stored on a punched tape 42, which represents the control input to the system. The program for forming a particular workpiece is encoded on tape 42 in a sequence of blocks of information, certain of which relate to commanded segments of motion of the cutter with respect to the workpiece, and other of which relate to necessary auxiliary functions to be performed by the machine tool, such as starting and stopping the flow of coolant, etc.

The blocks of information on the tape 42 are sequentially read and converted into electrical signals by a tape reader 44 and these signals are provided to an active storage unit and controller 46. This controller may be of the type disclosed in U.S. Pat. No. 3,069,608, and it acts to generate control signals for the machine tool of the type necessary to effectuate the commands encoded on the control tape 42. As schematically shown in FIG. 1, the signals from the controller are provided to the spindle drive 18, to an X-axis servo 48, which is associated with the X-axis drive 28, and to a Z-axis servo 50, which is associated with the Z-axis drive 36. The signal to the spindle drive 18 may be derived directly from commands stored on the tape 42. The signals to the X- and Z-axis servos 48 and 50 take the form of trains of pulses and the purposes of the servos are to control the drives so as to execute one increment of motion for each pulse received. The X- and Z-axis servos 48 and 50 are identical and the broad internal arrangement of the X-axis servo is illustrated in FIG. 1. The servos are of the phase-analog type generally illustrated in U.S. Pat. No. 3,011,110, and their operation will be disclosed in broad terms sufficient to identify the interrelation of the servos with the balance of the present system.

The servo includes a regular source of pulses in the form of a clock 52. The pulses are introduced to a pair of dividing counters which constitute a reference counter 54 and a command counter 56. Both counters are of the same length so that their outputs change state after the introduction of the same number of input pulses to each. The command counter 56 also receives command pulses provided by the controller 46 on line 58. These pulses may either be positive, in which case they advance the count by supplementing the clock pulses, or negative so as to retard the count by inhibiting a clock pulse. In the absence of any command pulse inputs to the counter 56 from the line 58, its output would represent a square wave substantially identical to the output of the reference counter 54. Any command pulses on line 58 act to change the crossover time of the last stage of the command counter 56 and thereby effectively introduce a phase shift into its output with respect to the output of the reference counter.

The output of the reference counter is filtered and amplified in the unit 60 and applied to one winding of a resolver 62 which has its shaft mechanically connected to the output of the X-axis drive unit 28. The other winding of the resolver 62 is applied to a phase discriminator 64 which also receives the output of the command counter 56. The output of the phase discriminator 64 is a voltage proportional to the phase difference between the command counter square wave and the reference counter square wave as shifted by the angle of the resolver 62. This voltage is applied to the X-axis drive and causes the drive to move in such a manner as to shift the resolver 62 to cause the two inputs to the phase discriminator 64 to be in phase with one another. In this manner the X-axis drive undergoes motions as commanded by the pulses on line 58.

As successive blocks are read by the tape reader 44 from tape 42, the controller 46 causes appropriate signals to be provided on output lines to cause the lathe to execute those commands. The controller includes internal means to determine when sufficient pulses have been provided to the servos to cause a command to be executed and then initiates the next command. However, this conventional method of sequencing commands does not produce the exact desired workpiece figuration under certain circumstances. Assume that the cutter 14, illustrated in FIG. 2, is moving along the Z-axis parallel to the centerline of the workpiece 12, and a radially symmetrical shoulder is to be formed at the line 70 by withdrawing tool 14 along the X-axis at an appropriate point in the sequence. It is clear that if the tool is withdrawn at the instant it reaches its appropriate Z-dimension a true radial shoulder will not be formed, but rather an uncut spiral section will remain on the workpiece. Accordingly, it is necessary that the tool dwell at its appropriate Z-position before the withdrawal command is executed.

The system of the present invention provides a dwell of the type described by means of a dwell-control subsystem 72 shown in FIG. 1. The action of the subsystem 72 is initiated when an appropriate dwell code is provided to unit 72 from the controller, on line 74. This appears after the tape reader 44 senses such code as part of an information block in the tape 42. Upon receipt of this signal, the control 72 provides a return signal to the controller 46, via line 76, which inhibits execution of the next command in the sequence contained in the part program. Thus, at the completion of the command presently being performed, the cutter and the workpiece will simply maintain their commanded position until the inhibit signal is removed, and will then execute the next instruction. The broad function of the dwell control 72 is to determine the proper time, in terms of machine operation, to terminate the inhibit command provided on line 72 to thereby allow the execution of the next command. In order to determine this time the control has a pair of inputs from each of the servo drives 48 and 50 as well as an input from a rotary pulse transducer 80 which is connected to the shaft 20 by a gear set 82, and produces an output pulse for each small incremental rotation of the shaft. Broadly, the dwell control utilizes signals from the X- and Z-servos to determine when the cutter has nearly reached the desired end dimension of its motion, and then allows the cutter to remain in position for one full rotation of the workpiece, as determined by the pulses from the transducer 80, to insure the proper formation of the programmed cut.

The inputs that the dwell control 72 receives from the two servos are taken from the outputs of their command counters and resolvers. Each of these signals is a square wave, and when they are exactly in phase with one another the controlled part has reached commanded dimension along the axis associated with that servo. A comparison of their phases provides a measure of the following error; that is, the error by which the cutter position differs from the commanded position. In a contouring system this error begins to build up when a command is initiated and then decreases as the end of the command approaches. FIG. 3 is a schematic diagram of the circuitry within the dwell control unit 72 which receives the reference and resolver signals from the two servos and determines when the cutter has reached a point sufficiently close to its end point to allow the one-cycle dwell period to be initiated.

Figure 3A:
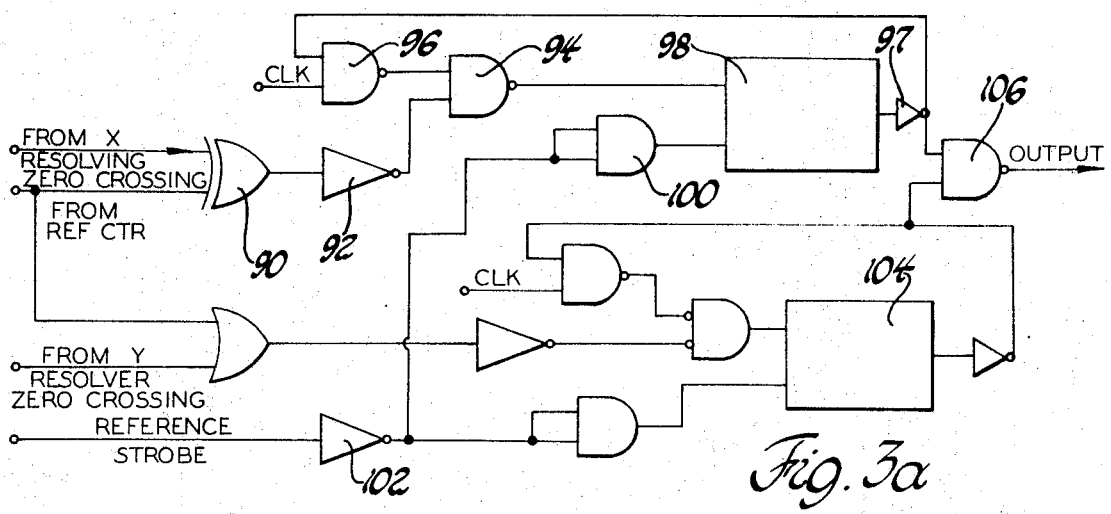
FIG. 3A is a schematic diagram of the preferred embodiment of the means for sensing the servo following error.
Figure 3B:
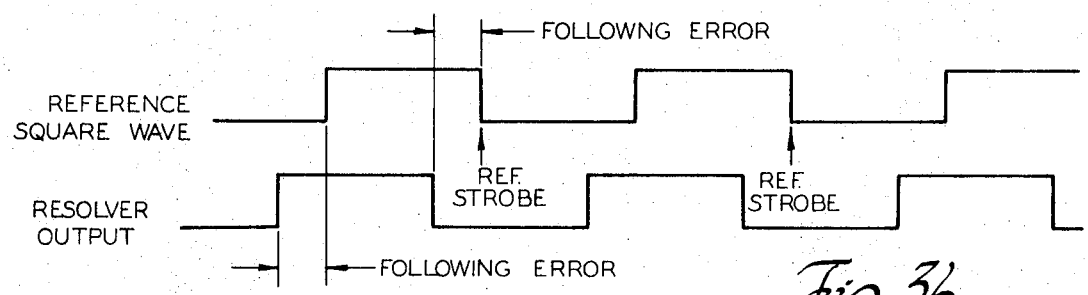
FIG. 3B is a graph illustrating the phase relationships in the servo which are analyzed by the dwell control.

Referring to FIG. 3A, the reference square wave which is the output of the reference counter, and the output of the X-resolver are both applied to an EXCLUSIVE OR-gate 90 which provides an output when either the resolver or the reference counter output is high and the other output is low. This signal is inverted by unit 92 and provided to a NOR-gate 94 along with the output of a NAND-gate 96 which has a clock signal as one of its inputs. The clock occurs at a rate approximately equal to a thousand times the rate of the square wave from the reference counter so each clock period represents a small fraction of shift of the resolver output with respect to the reference counter. The output of the NOR-gate 94 is applied to a counter 98 which provides an output when it reaches a count of twelve counts or more. As may be seen in FIG. 3B the clock pulses applied to the counter 98 during the period when the resolver output is high but the reference square wave is not yet high as well as the period when the reference square wave is high but the resolver output has gone low. Thus, the number of pulses received by the counter 98 is equal to twice the number of clock periods of phase shift between the resolver output and the reference counter. This technique is used simply to save components and in other embodiments of the invention a circuitry could be employed wherein the count provided to the unit 98 was exactly equal to the phase shift between the reference square wave in the resolver output, in terms of clock pulses.

When the counter 98 reached full count its output is provided to the NAND-gate 96 through an inverter 97 and inhibits the provision of further clock pulses. Upon the occurrence of the reference strobe time illustrated in FIG. 3B, wherein the reference square wave goes negative, the counter is cleared via gate 100 which receives the inverted reference strobe signal from unit 102. In this manner an output signal is provided by the counter 98 any time following the reference strobe that its count reaches the predetermined level indicative of a following error exceeding a predetermined time period. Similarly, the output of the Y-resolver is fed to an identical circuit servicing a counter 104. The outputs of the counters 98 and 104 are both fed through inverters to a NAND-gate 106 which accordingly provides an output when the following error on either the X- or Y-axis exceeds the predetermined limit.

Figure 4:
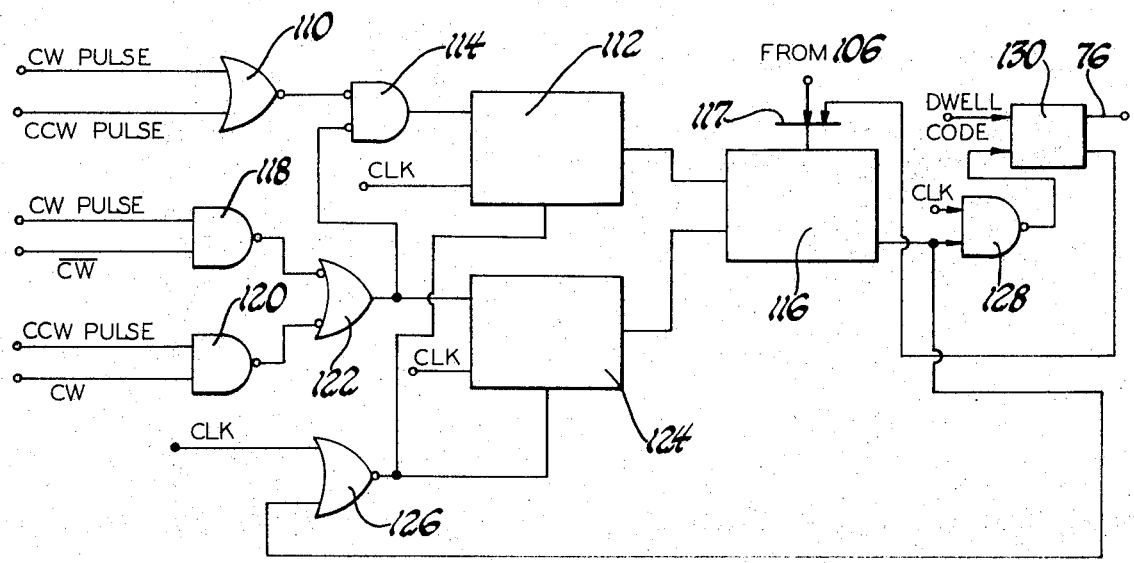
FIG. 4 is a schematic diagram of the preferred embodiment of the means for counting a predetermined number of pulses from the revolution transducer.

The circuitry for counting the spindle pulses generated by the transducer 80 after the gate 106 determines that both axes are within predetermined following error range is disclosed in FIG. 4. The pulse transducer and associated logic 80 may be of the type illustrated in U.S. Pat. No. 3,069,608 which provides output pulses on one line for each increment of clockwise rotation, and outputs on another line for each increment of counterclockwise rotation.

Both of these lines are provided to a NOR-gate 110 which sets a flip-flop 112 through NOR-gate 114. Each time the flip-flop 112 is reset by a clock pulse, a pulse is provided to the up-counting input of a bidirectional counter 116. A NAND-gate 118 receives clockwise pulses as well as a signal from the controller indicating that the commanded spindle-drive motion is in a counterclockwise direction. Similarly, a NAND-gate 120 receives the counterclockwise pulses plus a signal indicating that the rotation should be in a clockwise direction. A NAND-gate 122 provides either of these outputs to a flip-flop 124 which provides a down-counting pulse to the bidirectional counter 116 each time it is reset. These pulses which are sensed by the gates 118 and 120 represent jitter of the spindle and thus decrement the count. They are also provided to the NOR-gate 114 in order to inhibit the application of pulses from the gate 110 to the counter.

When the output of the counter 116 reaches its predetermined level a clear signal is sent to both of the flip-flops 112 and 124 via a NOR-gate 126 stopping further input counts. The output from the counter 116, which occurs after a sufficient number of counts have been introduced to insure that the spindle shaft 20 has undergone a full revolution, is provided to a NAND-gate 128. Unless both axes are nearly in position the signal from 106 clears the counter 116 before it reaches full count through OR-gate 117.

When the counter 116 does reach the full count, indicating that a full spindle revolution has occurred since both axes reached the critical distances from their end positions, an output will be provided by gate 128. This output resets a flip-flop 130, which has been previously set by the dwell code signal, removing the output on line 76 which inhibits the execution of the subsequent command and clearing the counter 116 through the OR-gate 117.

Referring again to FIG. 2, the count detected by the counters 98 and 104, which insure that the axes are almost in position, is termed the critical following error, which occurs shortly before the cutter has reached the actual shoulder. The small amount of stock that is left at this point is readily removed by the full cutter rotation. In the application of the present invention, this signal is initiated when a count of less than 12 is contained in both counters 98 and 104; since they count double the following error period, the total count cannot exceed five.

It is thus seen that upon the reading of an inhibit code from the tape, the system of the present invention monitors the following error on both axes and when the following error on both axes falls below a predetermined level, the count is made as spindle pulses to insure an appropriate length dwell.

While the preferred embodiment of the system is used in connection with a contouring control system for a lathe, other embodiments of the invention might utilize point-to-point control systems and other forms of machine tools such as mills and drill presses.

Having thus described my invention, I claim:

1. In a control system for a machine tool operative to control the position of the machine tool cutter with respect to a workpiece through a sequence of positions in accordance with a sequence of numerical commands, means, under control of a numerical command, for inhibiting the execution of a given command in the sequence, said means comprising: means for sensing the completion of a command in the sequence previous to the given command; means for measuring motion of the tool with respect to the workpiece, and means for providing a control signal operative to inhibit the execution of said given commands until a predetermined motion of the cutter with respect to the workpiece has occurred, following the completion of said previous command.

2. The system of claim 1 wherein said means for sensing the completion of a command in the sequence comprises means for comparing the commanded position of the cutter relative to the workpiece with its actual position relative to the workpiece.

3. The system of claim 2 wherein the system employs a servo and a resolver and the actual position of the cutter with respect to the workpiece is determined by inspection of the output of the resolver.

4. The system of claim 3 wherein the servo employs a command counter and a reference counter and the comparison of the actual position of the cutter with respect to the workpiece with its commanded position with respect to the workpiece is made by comparing the output of the resolver with the output of the reference counter.

5. The system of claim 1 wherein the means for measuring the motion of the tool with respect to the workpiece includes a transducer operative to provide an electrical pulse for each increment of motion of the cutter with respect to the workpiece and means for counting such pulses.

6. The system of claim 5 wherein the machine tool includes a rotary spindle and the transducer provides an output pulse for each increment of rotation of the spindle.

7. A system for controlling the operation of a machine tool having a rotary spindle and a cutter movable with respect to such spindle, comprising: a source of a series of numerical commands relating to desired sequential motions of the cutter relative to the spindle; a drive system for said spindle; a drive spindle for said cutter; means for receiving said sequence of numerical commands in serial order and for generating control signals for both said drives of such nature as to cause said cutter to move with respect to said workpiece through said sequential motions; and means for inhibiting the generation of control signals to at least one of said drives under control of a numerical command contained in said sequence, said last said means comprising means for generating a control signal which inhibits the execution of a given command in the sequence, means for measuring the completion of a command in the sequence previous to said given command, means for measuring the rotation of the spindle, and means for terminating said control signal upon the spindle undergoing a predetermined rotation following the achievement of a predetermined degree of completion of said previous command in said sequence.

8. The system of claim 7 wherein a predetermined degree of completion of said previous command in the sequence occurs at a point in time slightly previous to the full completion of said previous command in the sequence.

9. The system of claim 7 wherein the control signal for the cutter drive constitutes a train of pulses, the drive includes a reference counter, a command counter, the command counter receiving said train of pulses, and a resolver having one winding connected to the output of one of the counters and the means for sensing the completion of a command in the sequence comprises means for comparing phases of the output of the resolver and the other counter.

10. The system of claim 8 wherein the means for comparing the phase of the output of the resolver with the other counter includes a source of pulses, a counter, and gate means operative to connect the source of pulses to the counter during the time between the transition of the output of the resolver in one direction and the transition of the output of the other counter in the same direction.

11. The system of claim 10 wherein the cutter is movable with respect to the tool along a pair of mutually perpendicular axes, a drive is provided for each of the axes, and means for comparing the phase of the other counter with the phase of the output of the resolver is provided for each axis.

12. In a control system for the position of a cutter of a machine tool with respect to a workpiece, in combination: a source of a series of numerical commands, each including information relating to one of the sequence of motions of the cutter with respect to the workpiece; a drive system for said cutter; a drive system for said workpiece; means for receiving said numerical commands sequentially and for generating sequences of control signals representative of said commands for said drives; and means for inhibiting the generation of a control signal representative of one command including means for determining the difference between the commanded position of the cutter and the actual position of the cutter, means for generating a first control signal upon such difference achieving a predetermined level; means for measuring the motion of the workpiece with respect to the cutter, and means for generating a second control signal upon the completion of a predetermined motion of the workpiece with respect to the cutter after the generation of said first control signal.